United States Patent Office 3,431,800
Patented Mar. 11, 1969

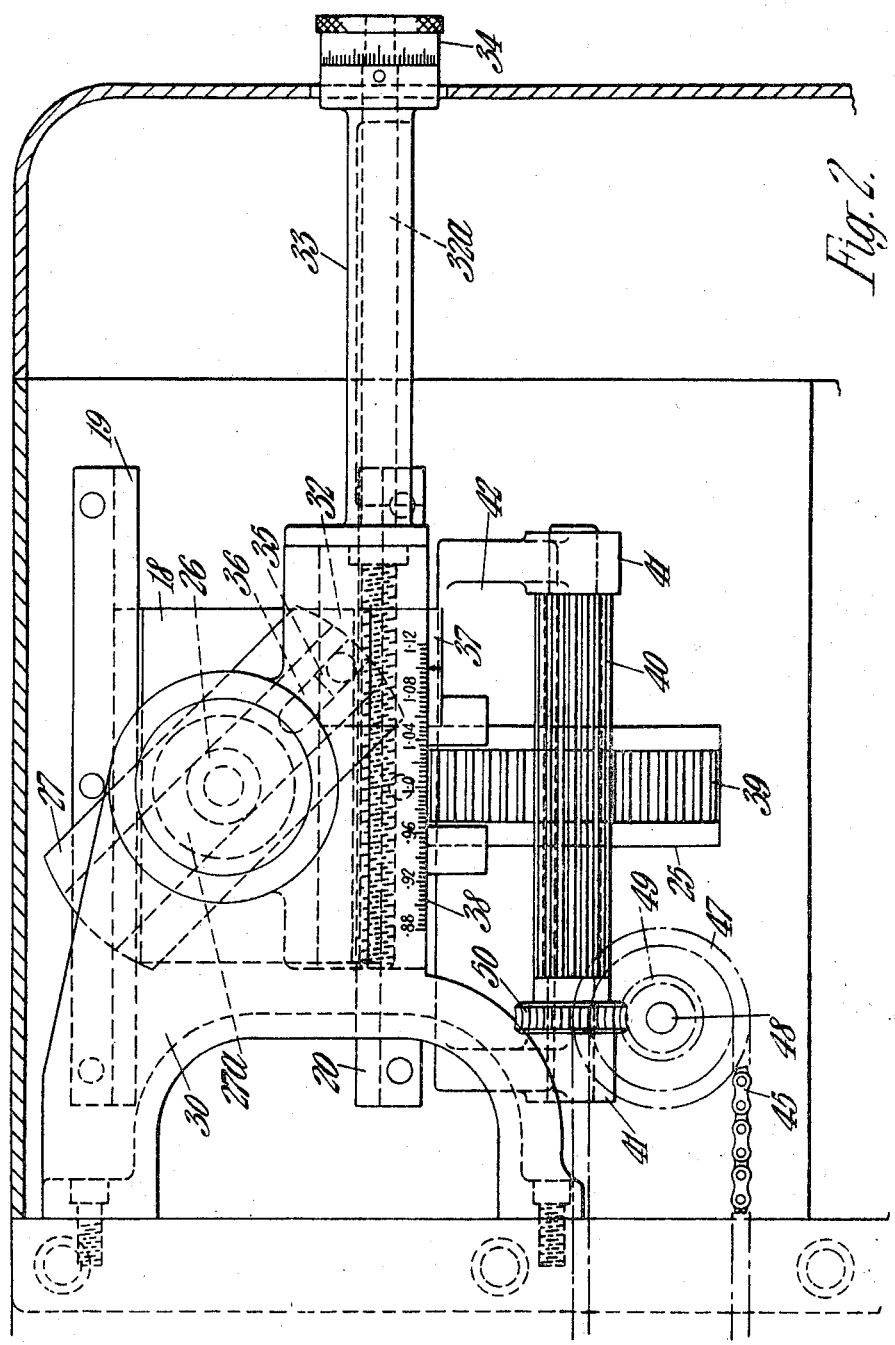

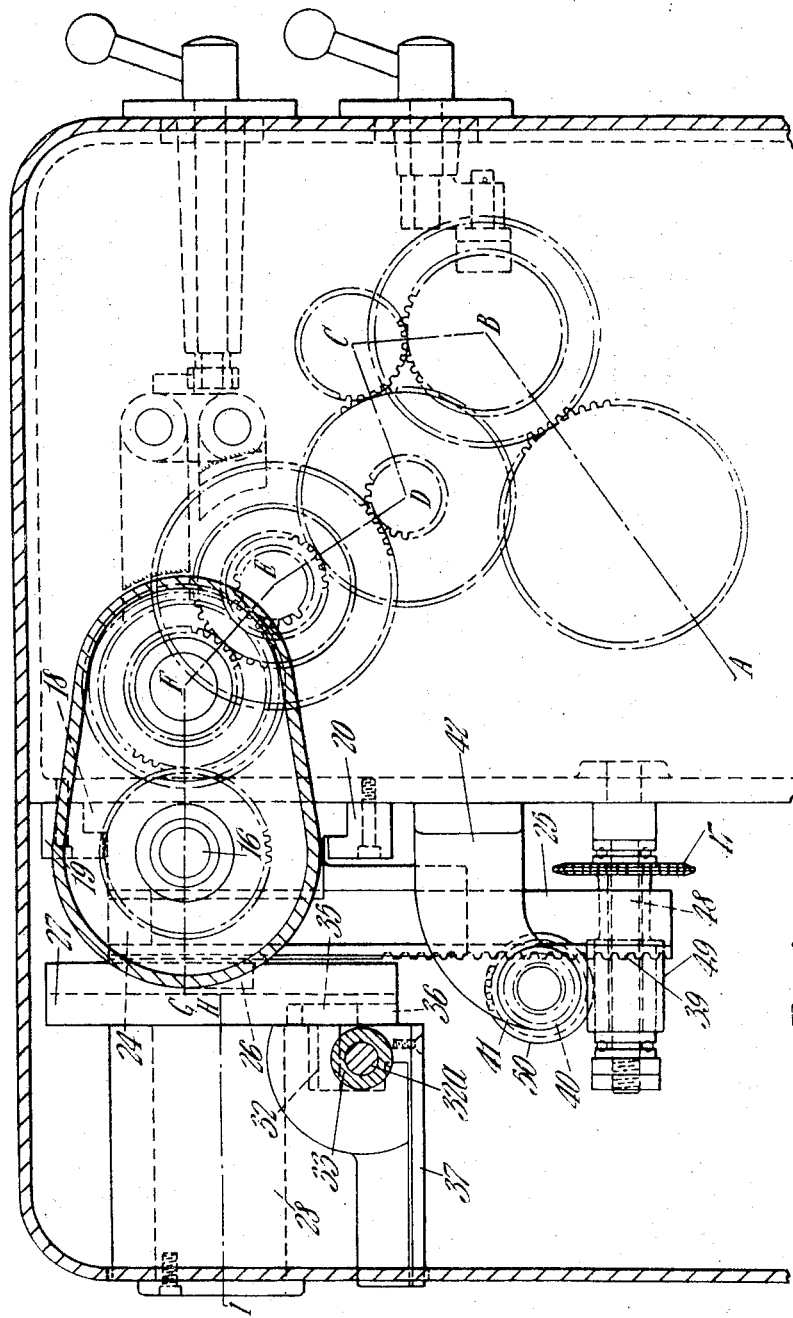

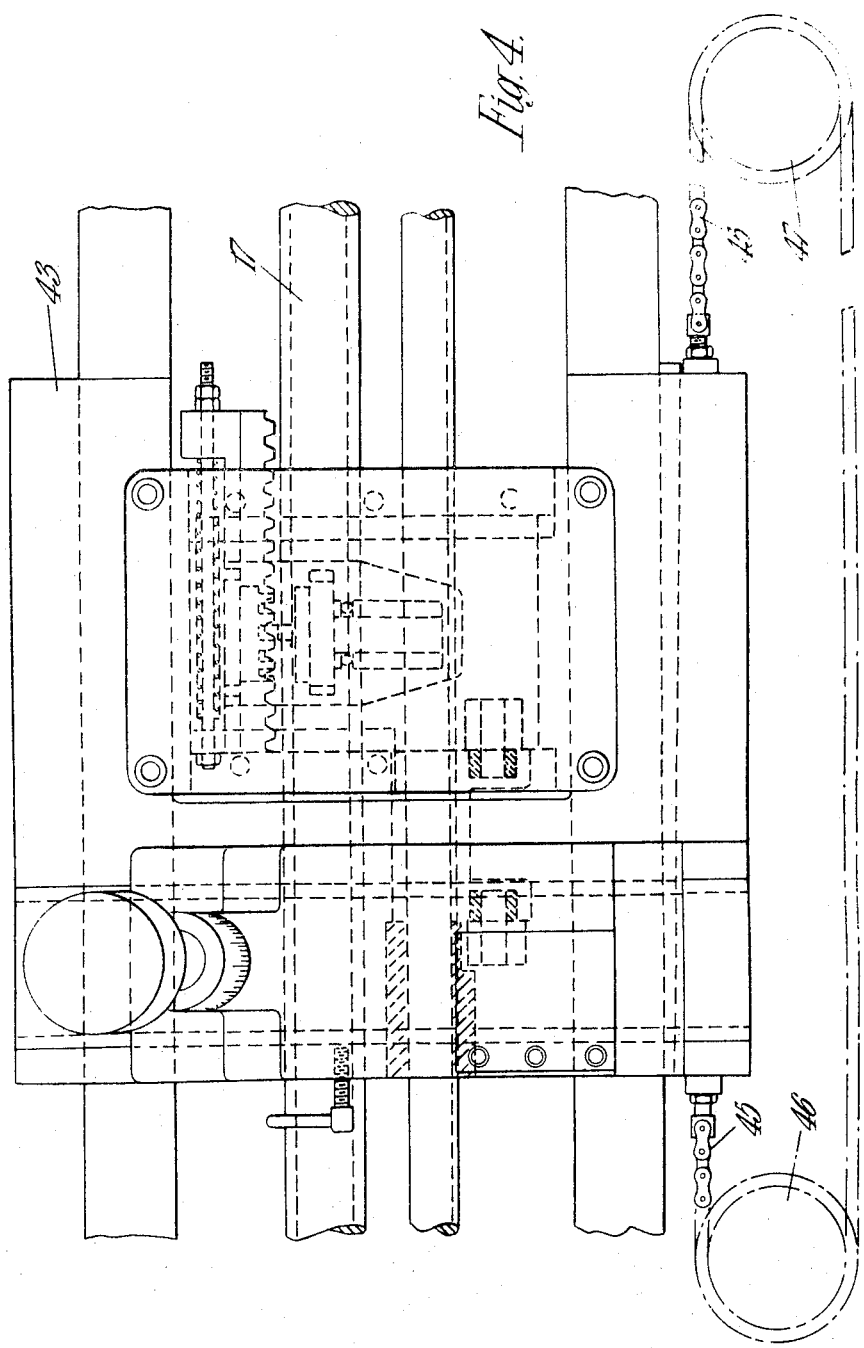

3,431,800
SCREW-CUTTING LATHES AND OTHER
SCREW-CUTTING MACHINES
Albert Lucie, Johnstone, Scotland, assignor to Wickman
Lang Limited, Johnstone, Renfrewshire, Scotland, a
British company
Filed Apr. 15, 1966, Ser. No. 542,797
U.S. Cl. 82—5        4 Claims
Int. Cl. B23b 1/12, 1/00, 21/00

ABSTRACT OF THE DISCLOSURE

A screw-cutting machine has a work spindle to which a work piece can be clamped and rotated thereby, a lead screw driven in timed relation with the work spindle, a saddle for supporting a work cutting tool the saddle having a nut member which normally engages the lead screw so that rotation of the latter imparts to the saddle and tool carried thereby a traverse movement parallel to the lead screw. The lead screw has axial extension which is journalled in a bearing which is mounted to slide axially between fixed guides. The bearing has a slot and sliding within the slot is a slide which is reciprocated by means of the saddle. The machine is further provided with an angularly adjustable channel member and a roller carried by the slide works in the channel. When the slide is reciprocated the co-operation of the roller with the channel results in the bearing with lead screw being slid to an extent and in a direction predetermined by the angular adjustment of the channel member, such movement being transmitted to the channel member so that the traverse of the saddle is that due to the lead screw and to the axial movement imparted to the lead screw.

---

This invention has reference to screw-cutting lathes and screw-cutting machines, hereafter referred to as screw cutting-machines.

The invention refers particulraly to screw-cutting machines of the kind in which the work piece clamped to the work spindle is rotated and cut by a tool mounted on a saddle which is traversed axially along the workpiece by means of a lead screw driven in timed relationship to the rotation of the work piece, the saddle being coupled to the lead screw by means of a half nut or two complementary half nuts.

It will be appreciated that a multiplicity of cuts must be made in the workpiece in order to cut a thread of the requisite depth and that after each cut the saddle with tool must be returned to its initial position before commencing the next cut. It will also be appreciated that the tool must register correctly with the previously cut thread in commencing each succeeding cut.

In cutting a screw of such pitch that the threads per inch is an exact multiple of the threads per inch of the lead screw the half nut is disengaged from the lead screw after each cut, the saddle returned to its initial position and the half nut then again engaged with the lead screw, the tool then registering correctly with the previously cut thread. This procedure cannot be used where the threads per inch of the screw being cut is not an exact multiple of the threads per inch of the lead screw. Where such is the case the half nut is not released from the lead screw and the latter is rotated in the reverse direction to return the saddle to its initial position, the tool remaining in correct relationship to the cut thread during is return movement.

The present invention has for its object to provide improvements in machines of the kind set forth by which, on disengaging the half unt, the saddle with tool can be quickly returned preparatory to making the next cut and the half nut engaged with the lead screw with assurance that the tool will correctly register with the thread already cut in the work piece irrespective of the ratio of the number of threads per inch being cut to the number of threads per inch in the lead screw.

A preferred embodiment of the invention will now be described with reference to the accompanying drawings wherein:

FIGURE 2 is a rear elevation of FIGURE 1 with cover removed;

FIGURE 3 is a section on the line 3—3 of FIGURE 1; and

FIGURE 4 is an elevation of the saddle, the lead screw and part of the means for imparting a controlled axial movement to the lead screw.

Figure 1:
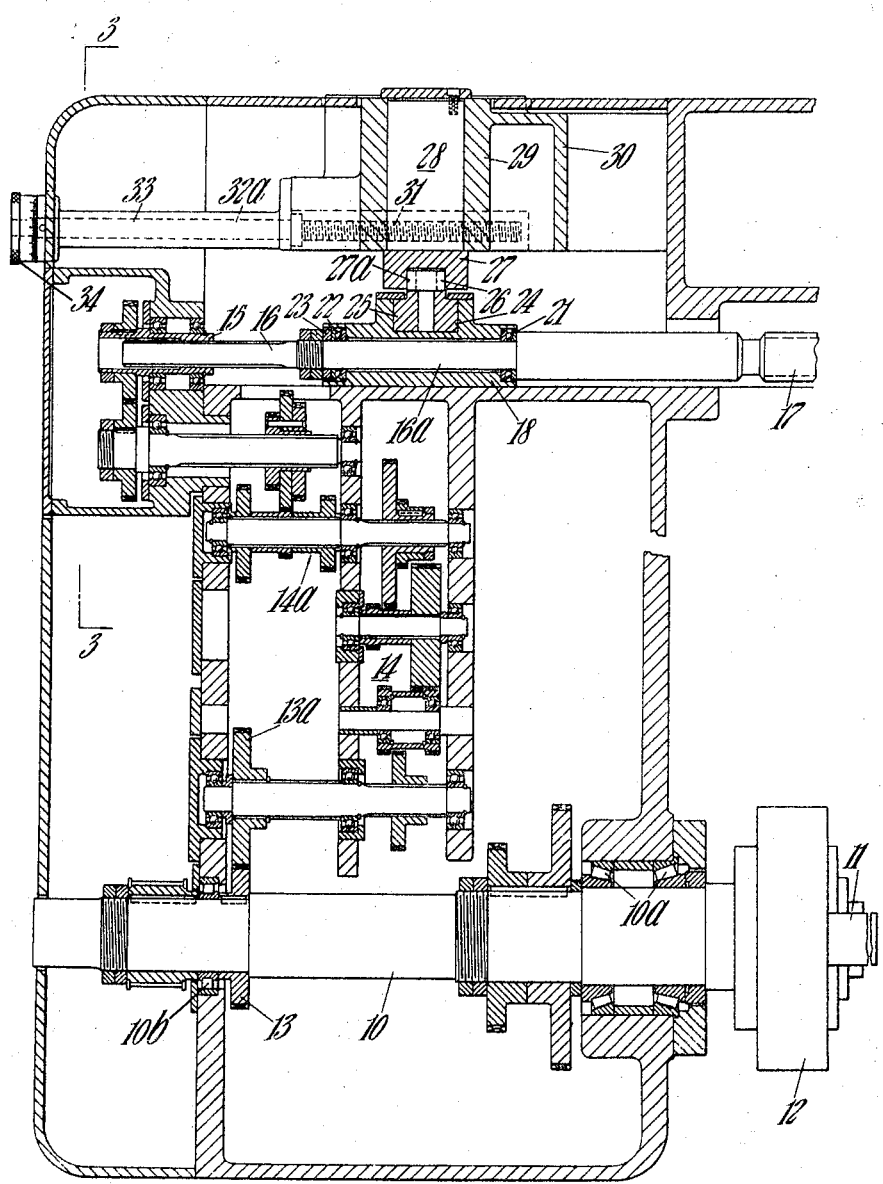
FIGURE 1 is a sectional layout plan view of part of a screw-cutting machine in accordance with the invention the section being on the line A, B, C, D, E, F, G, H, I of FIGURE 3.

In the drawings 10 denotes the driven spindle of a screw cutting machine of the kind set forth. This spindle, which is journalled in bearings 10a and 10b and is driven through suitable gearing by a motor, not shown, rotates the workpiece 11 which is held in the chuck 12. The spindle also drives a sleeve 15 through spur wheels 13 and 13a and gear boxes or change wheels 14 and 14a of conventional form. The sleeve is splined on the end 16 of an axial extension 16a of the lead screw 17. The gear box or change wheels is such that by adjustment thereof the rotational speed of lead screw 17 relative to that of the workpiece can be adjusted to a selected simple ratio, that is any ratio wherein the threads per inch to be cut is an exact multiple of the threads per inch of the lead screw. The axial extension 16a is journalled in an axially sliding bearing 18 which is mounted to slide in fixed guides 19 and 20 extending parallel to the lead screw. A thrust bearing 21 is introduced between a shoulder of the lead screw and one end of the bearing and a second thrust bearing 22 is introduced between the other end of the bearing and a collar 23 encircling the extension. The other end of the lead screw, which end is not shown, is journalled in a bearing in which it can slide axially.

The bearing is slotted at 24 to form a vertical guide in which works a slide 25 which carries a roller 26. The roller travels in a channel 27a of an angularly adjustable member 27 provided with a cylindrical lateral extension 28. The cylindrical extension is rotatable in a bearing 29 formed in a bracket 30 bolted in the main frame or bed of the machine.

The cylindrical extension 28 is rotatable in its bearing to angularly adjust the channel by means of a screw 31 and nut 32. The screw is formed on the inner end of a spindle 32a supported in a housing 33 extending from the bracket 30. At its outer end the spindle has fast thereon a manually rotatable micrometer dial 34 by which the screw can be rotationally adjusted, the extent of the adjustment being indicated by the dial. The nut carries a pad 35 which travels in a slot 36 in the channel member 27. The angular adjustment of the member 27 is indicated by means of a finger 37 secured to the nut, the finger having an arrow or other mark which reads against a fixed linear scale 38.

A rack 39 is cut in the slide 25 and meshing with the rack is an elongated pinion wheel 40 journalled in end bearings 41 carried by a bracket 42 secured to the machine frame or bed.

The saddle 43 which carries the cutting tool has connected thereto one end of a chain 45. The chain passes over a sprocket wheel 46, then over a second sprocket wheel 47 and its other end is connected to the saddle. Sprocket wheel 47 is fast on a spindle 48 on which is fast a worm 49 which meshes with a worm wheel 50 which rotates the elongated pinion wheel 40.

The saddle has a half nut which can be brought into engagement with the lead screw.

It will be appreciated that the travel of the saddle first in one direction and then in another imparts through the chain 45, the worm 49, the worm wheel 50 and the elongated pinion wheel 40 a vertical reciprocating movement to the rack 39 and roller 26. If the channel in which the roller travels is in alignment with the travel of the rack the roller reciprocates idly. Should however the channel member not be so aligned the roller will co-operate therewith and the bearing 18 together with the lead screw will be displaced to an extent and in a direction depending on the inclination of the channel.

In using the screw-cutting machine, adjustment is made in the gear boxes or change wheels 14 and 14a to obtain a simple gear ratio as above described or alternatively to obtain the nearest approximation to such gear ratio. It may be that the thread being cut is one in which he simple gear raito will suffice and in such case the angularly adjustable member 27 is adjusted to lie at right angles to the axis of the lead screw 17. In that case the half nut is moved into mesh with the lead screw, the saddle is traversed solely by the rotation of said screw, and at the end of the cut the half nut is withdrawn, the saddle returned to its initial position and the half nut again brought into mesh with the lead screw preparatory to making the next cut.

As an example of a simple gear ratio assume that there are two threads per inch in the lead screw and it is required to cut a thread in the work piece having ten threads per inch, that is a pitch of 0.1 inch. Here the pitch or the number of threads per inch to be cut is an exact multiple of the threads per inch of the lead screw, that is a 5 to 1 ratio, and in cutting the thread no axial movement must be transmited to the lead screw. That is the channel member must be so positioned that the roller travels idly therein.

If in cutting a screw of such pitch that the threads per inch is not an exact multiple of the threads per inch of the lead screw the channel member is angularly adjusted by rotating the micrometer dial 34. The adjustment results in the roller 26 no longer reciprocating idly in the channel but co-operates therewith to impart thereto, and therefore to the bearing 18 and the lead screw, an axial movement and the saddle and cutting tool is moved axially in unison therewith. The travel of the saddle is then that due to the rotation of the lead screw and that due to the axial movement thereof.

The aforesaid axial movement is controlled by the axial extent and direction of the angular adjustment of the channel member 27.

The required angular adjustment will be understood by the following example. It will again be assumed that the lead screw has two threads per inch but now it will be assumed that it is required to cut a thread having a pitch of 0.105 inch, that is there are less than ten threads per inch and therefore the threads per inch are not an exact multiple of the threads per inch of the lead screw. The nearest exact multiple is ten which is equivalent to a pitch of 0.10. The difference between the required pitch 0.105 inch and the pitch which is the exact multiple is 0.005 inch and this is the extent of the axial movement which must be imparted to the lead screw for each revolution of the workpiece. Such axial movement is obtained by adjusting the angular position of the channel member to the position which is shown by the linear scale to read 0.005.

When the saddle is returned to its initial position after making each cut the tool will be in such position that when the half nut meshes with the lead screw the tool is positioned to engage in the thread already partially cut.

By imparting a controlled axial movement to the lead screw it is possible to cut threads having an infinite range of pitches without the use of gearing other than the conventional gearing introduced between the work spindle and the lead screw.

What I claim is:

1. A screw-cutting machine having a work spindle to which a work piece can be clamped and rotated thereby, a lead screw driven in timed relation with the work spindle, a saddle for supporting a work cutting tool the saddle having a nut member normally engaging the lead screw so that rotation of the latter imparts to the saddle and tool carried thereby a traverse movement parallel to the lead screw, the lead screw having an axial extension and the machine having a bearing in which the axial extension is journalled, and fixed guides along which the bearing can be moved in an axial direction, the bearing having a slot, a slide within the slot, means actuated by the saddle whereby the slide is reciprocated in its slot during the whole traverse movements of the saddle, an angularly adjustable channel member and means carried by the slide and working in the angularly adjustable channel, the co-operation of said member with the channel imparting a sliding movement to the bearing in its guides and therefore to the lead screw to an extent and direction determined by the angular setting of the channel member so that the traverse of the saddle is that due to the rotation of the lead screw and that due to the axial movement imparted to the lead screw.

2. A screw-cutting machine as claimed in claim 1 having rack and pinion mechanism to reciprocate the slide, and means actuated by the travel of the saddle to impart a rotary movement to the pinion first in one direction and then in the other direction, the rack sliding transversely along the pinion wheel when the bearing travels in its guides.

3. A screw-cutting machine as claimed in claim 2 having chain and sprocket gearing in combination with a worm and worm wheel gearing to drive the pinion wheel, the chain being attached to the saddle.

4. A screw-cutting machine as claimed in claim 1 wherein the angularly adjustable channel is adjustable by a screw having a calibrated micrometer dial.

References Cited

UNITED STATES PATENTS

| 1,718,480 | 6/1929 | Mueller | 82—5 |
| 2,021,537 | 11/1935 | Bath | 82—5 |
| 2,118,489 | 5/1938 | Carter | 82—5 |
| 2,231,000 | 2/1941 | Drissner | 82—5 |
| 2,309,299 | 1/1943 | Bickel | 82—5 |
| 2,351,921 | 6/1944 | Bullard | 82—5 |
| 3,045,504 | 7/1962 | Emery | 82—5 X |
| 3,090,267 | 5/1963 | Trumpp | 82—5 |
| 3,145,596 | 8/1964 | Brilliantine | 82—5 |

HARRISON L. HINSON, *Primary Examiner.*